United States Patent
Illigen et al.

[15] 3,660,132
[45] May 2, 1972

[54] PROCESS OF MAKING A HIGHLY DISPERSED MIXTURE OF CARBON BLACK AND SILICIC ACID

[72] Inventors: Alfred Illigen, Heerbrugg, Switzerland; Walter Neugebauer, Constance/Bodensee, Germany

[73] Assignee: Deutsche Gold-und Silber-Scheideanstalt Vormals Roessler, Frankfurt, Germany

[22] Filed: Sept. 24, 1970

[21] Appl. No.: 75,130

[30] Foreign Application Priority Data

Sept. 25, 1969 Germany .....................P 19 48 443.6

[52] U.S. Cl..............................................................106/307
[51] Int. Cl.........................................................C09c 1/48
[58] Field of Search......................................106/288 B, 307

[56] References Cited

UNITED STATES PATENTS

| | | | |
|---|---|---|---|
| 3,094,428 | 6/1963 | Hamilton et al. | 106/307 |
| 2,578,605 | 12/1951 | Sears et al. | 106/288 B |

*Primary Examiner*—James E. Poer
*Attorney*—Michael S. Striker

[57] ABSTRACT

A highly dispersed homogeneous mixture of activated carbon black and activated silicic acid is formed by subjecting gaseous silicon monoxide or a mixture thereof with a gaseous metal oxide to the action of a gaseous oxidizing agent and passing substantially simultaneously a material that forms carbon black upon decomposition into the oxidizing zone or into the stream of gas right above the oxidizing zone.

11 Claims, 4 Drawing Figures

INVENTOR
ALFRED ILLIGEN
WALTER NEUGEBAUER
BY
Milton S. Stroka
ATTORNEY.

PROCESS OF MAKING A HIGHLY DISPERSED MIXTURE OF CARBON BLACK AND SILICIC ACID

BACKGROUND OF THE INVENTION

The invention relates to a process of making highly dispersed mixtures consisting predominantly of activated carbon black and activated silicic acid.

Highly dispersed materials, that is both inorganic white fillers or pigments, for instance titanium dioxide, aluminum oxide and silicon dioxide as well as black fillers (carbon black), are widely applied in many areas of chemical technology, particularly as reinforcing fillers in rubber compositions and synthetic elastomers. By far the most important highly dispersed fillers are silicon dioxide (activated silicic acid) and carbon black (activated carbon black). The reinforcing properties of these materials usually appear only when they are present in a very fine distribution. This normally implies a material which possesses a specific BET surface above about 50 m$^2$/g.

In conventional processes, silicic acid is principally obtained by wet precipitation from alkali silicate solution by means of acids. More recently, processes have become known for making highly dispersed silicic acid which involve the flame hydrolysis of silicon tetrachloride and the oxidation of gaseous silicon monoxide. Carbon black in industrial practice is usually obtained by the thermal decomposition or incomplete combustion of carbon compounds.

The usefulness of activated carbon black is mainly based on its hydrophobic organophilic properties, while that of the activated silicic acid is due to its hydrophilic properties. There are, however, applications where it is desirable to make use both of the properties of activated carbon black and of activated silicic acid. Attempts have therefore been made to employ both materials at the same time. However, this required that both materials be present in a perfect mixture, since only then is it possible to obtain the desired action in a uniform manner in the entire range of mixtures.

However, mixtures of silicon dioxide and carbon black formed by mechanical mixing operations either prior to incorporation in the final product or thereafter have so far been obtained in a homogeneous mixture only to a very limited extent. Usually there is obtained a mixture only of agglomerates of silicon dioxide and carbon black.

Efforts have therefore been made in numerous cases to obtain improved products. For instance, according to a prior-part procedure (U.S. Pat. No. 2,156,591) carbon-containing silicic acid is made by pyrolysis from a mixture of tar and kieselguhr in the absence of air.

It has also been proposed (U.S. Pat. No. 3,094,428) to make metal oxide-carbon black mixtures by decomposing metal compounds and unsaturated hydrocarbon compounds, particularly acetylene or benzene in an oxygen-containing reducing flame to obtain metal oxide-carbon black mixtures wherein carbon black is present up to 50 percent. Another prior-art procedure (U.S. Pat. No. 2,632,713) proposes to introduce combustible compounds of silicon, boron or germanium into the flame of a special carbon black burner. As combustible compounds there are particularly proposed orthoesters, hydrogen-containing or metal-organic compositions. The mixtures obtained contained a maximum of 10 percent of the oxides of silicon, boron or germanium.

All these processes involve a number of shortcomings. The mixtures obtained are inactive because they have too large a particle size. The mixing ratio of carbon black and metal oxides is rather limited. The metal compounds introduced into the mixture are attached to elements such as chlorine which have a corrosive effect. The compounds also may be too expensive or dangerous to handle. The flue gases originating in these processes have nor or only a very limited calorific value.

It is therefore desirable to provide for a process of making silicon dioxide-carbon black mixtures in which the silicon dioxide primary particles, as well as the carbon black primary particles, may be caused to originate simultaneously and to form an intimate mixture immediately upon their formation. This process then would not incur the previously listed shortcomings.

The present invention also has the object to provide for a process of making highly dispersed homogeneous mixtures consisting predominantly of activated carbon and activated silicic acid which process is effective by reaction of metal oxides and silicon oxides or silicon oxides alone with carbon compounds which will lead to products that can be used as reinforcing fillers for rubber elastomers.

SUMMARY OF THE INVENTION

These and other objectives are attained by the process of the invention wherein gaseous silicon monoxide or a mixture thereof with a gaseous metal oxide is subjected to the action of a gaseous oxidizing agent in an oxidizing zone and wherein a material that forms carbon black upon decomposition is passed either directly into the oxidizing zone or immediately thereafter into the flow of gas emanating therefrom. There is thus formed substantially simultaneously the decomposition of the carbon black-forming material and the formation of the mixture of activated silicic acid and activated carbon black.

The novel features which are considered as characteristic for the invention are set forth in particular in the appended claims. The invention itself, however, both as to details of construction and procedure, will be best understood from the following description of specific embodiments when read in connection with the accompanying drawing.

DETAILED DESCRIPTION OF THE INVENTION AND OF PREFERRED EMBODIMENTS

The important feature of the invention is the formation of homogeneous mixtures within the primary particle range which is obtained by pyrolytic reaction of silicon oxides or mixtures of silicon oxides and metal oxides with carbon compounds in the gaseous phase. This is accomplished by reacting the gaseous silicon monoxide, or the mixture thereof with gaseous metal oxide, with a gaseous oxidizing agent in an oxidation zone and passing the carbon black furnishing materials directly into the oxidation zone or immediately subsequent thereto into the flow of gas emanating from the oxidation zone in order to effect the decomposition of the carbon black forming materials. Surprisingly, it is possible in this manner to obtain highly dispersed homogeneous silicon dioxide and carbon black-containing mixtures and, if desired, mixtures which in addition contain silicon monoxide and silicon carbide. The mixture in these cases is formed during the formation of the components and therefore in the area of the primary particles. Thus, the optimum combination of properties of the individual components is possible.

Gaseous silicon monoxide is a chemically highly reactive material which, as is well known, can easily be reacted with oxidizing agents such as air or steam to form silicon dioxide and can be reacted with reducing agents such as hydrocarbon compounds to form silicon carbides.

It was unexpected and is surprising that the oxidation of the silicon monoxide to silicon dioxide and the decomposition of the carbon-containing compounds to form carbon black can be effected virtually simultaneously without any material interference with the individual reactions. It appears that the gaseous silicon monoxide combines preferentially, that is with greater speed, with the available oxygen than with the available carbon-containing compounds. To put it differently, oxygen apparently combines preferentially with silicon monoxide to form silicon dioxide rather than with carbon compounds to form carbon monoxide.

Figure 1:
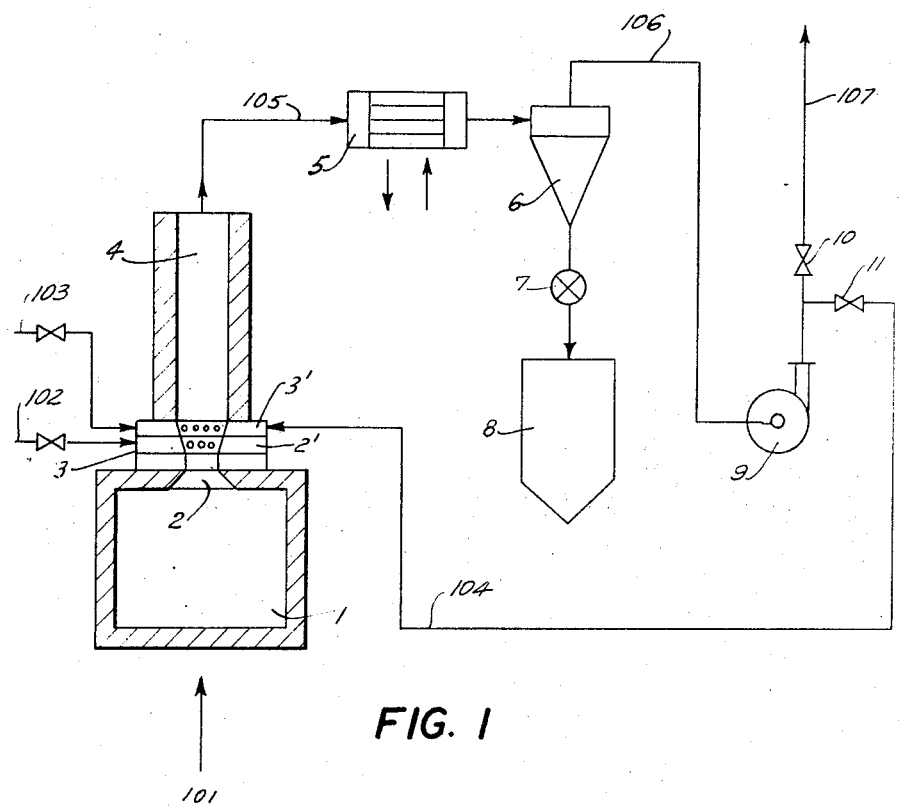
FIG. 1 is a diagrammatic representation of an apparatus illustrating the manner of practicing the process of the invention.

The drawings explain the reaction and suitable apparatus therefor in a schematic manner. With reference particularly to FIG. 1, it will be noted that a stoichiometric mixture of quartz (SiO$_2$) and coke, or a quartz and silicon mixture is continuously introduced through an inlet 101 into an electrothermal furnace 1 wherein, for instance, an electric arc is formed. The gaseous silicon monoxide formed at the higher temperature within the furnace then flows through an outlet 2, the gas mixture possibly containing carbon monoxide. Directly above the outlet 2 a gas mixing chamber 3 is provided which has two super-imposed chambers 2' and 3' with inwardly directed bores which permit to mix the silicon monoxide containing gas current with additional gases or liquids.

The agent necessary to oxidize the silicon monoxide and, if present, the carbon monoxide such as air may for instance be introduced through the duct 102. Through duct 103 the compound which decomposes into carbon black is introduced. The decomposition, therefore, takes place immediately within the oxidation zone or directly above it in chamber 4 which preferably is provided with a heat insulation.

The reaction product thus formed is suspended in the gas current which is passed through duct 105 to a heat exchanger 5 and subsequently to a separator 6 from which the solid product is passed through a valve 7 into a receptacle 8. The residual gas is moved by suction from a ventilator 9 through the duct 106 and then through duct 107 for removal from the operation. If the gas is to be circulated, however, it can be passed through duct 104 back into the mixing chamber 3. Excess gas can be removed through duct 107, if desired, by means of valves 10 and 11.

Figure 2:
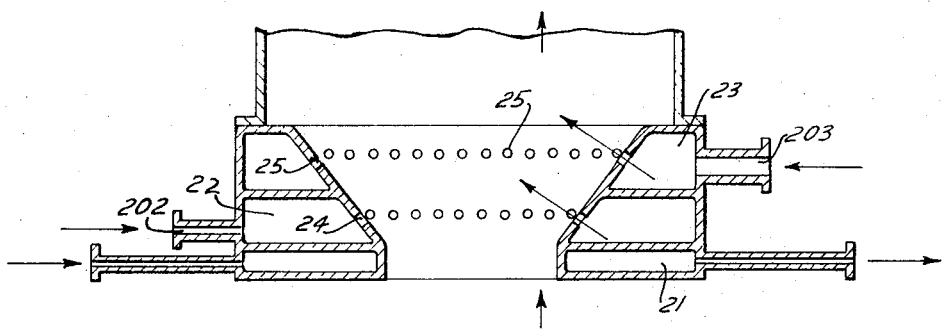
FIGS. 2–4 show in cross-section various embodiments of the combustion chamber which may be employed in connection with the apparatus of FIG. 1.
Figure 3:
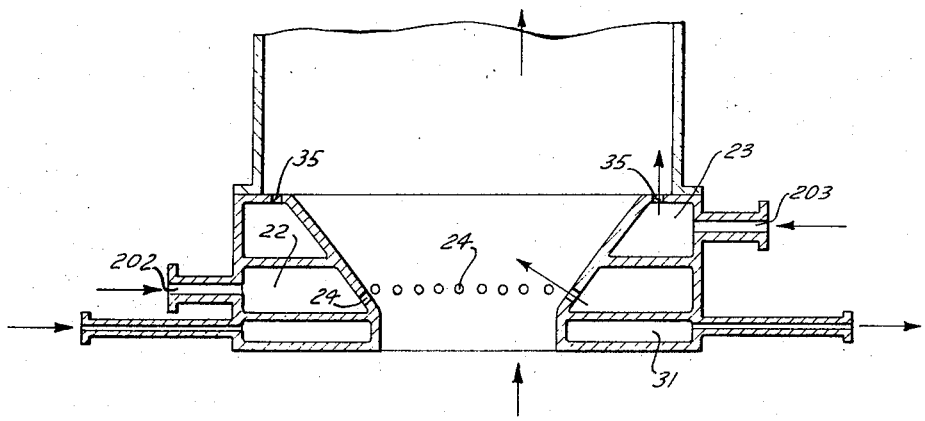
Figure 4:
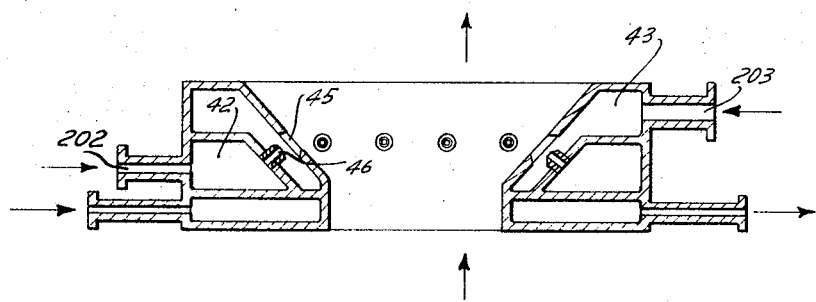

FIGS. 2-4 show various embodiments of the mixing device 3. The silicon monoxide-containing current of gas enters the lower part of this device from below. With reference particularly to FIG. 2, it will be seen that the chamber 21 is provided to receive a cooling agent, for instance water or oil. The agent, which is required for oxidizing the silicon monoxide, such as for instance air, oxygen or water, enters the superimposed chamber 22 through an inlet 202 and leaves the chamber by means of bores 24 which are arranged in an annular manner. The direction of the bores can be such that the oxidizing agent enters the hot silicon monoxide gas flow at right angles or at a desirable angle of inclination.

The size and number of the bores should be commensurate with the amount of oxidizing agent fed into the device and the available cross-section of the mixing chamber in order to permit the oxidizing agent to penetrate into the center of the silicon monoxide gas current.

The decomposable carbon compound is introduced into the chamber 23 through an inlet 203 and leaves the chamber through bores 25.

The bores 25 in the embodiment of FIG. 2 are arranged to permit the decomposition of the carbon black forming compound directly above the silicon monoxide oxidation zone. This results in a higher decomposition speed. The bores 35 in FIG. 3, on the other hand, are arranged in the top face of the chamber 31. This permits to obtain a larger reaction space for the decomposition, but the relative share of combustion or the decomposable material will be smaller in this case.

FIG. 4 illustrates an embodiment where the oxidation agent enters from chamber 42 through a circle of inlet openings 46 while the decomposable carbon compound enters through annularly arranged apertures 45 from chamber 43.

The decomposition of the carbon black-forming compound is effected by the high heat of reaction which occurs with the oxidation of the gaseous silicon monoxide and possibly carbon monoxide by oxygen which latter may be present also in the form of air, steam or carbon dioxide. Heat additionally is furnished by the heat contents of the silicon monoxide which leaves the mixing chamber at a temperature of 2000° C and which also may contain carbon monoxide. Since the decomposition reaction takes place directly in the gaseous phase, it has a high thermal efficiency and forms the most effective use of the heat liberated with the formation of silicon dioxide from the silicon monoxide.

In the conventional devices and processes where chilling was effected by blowing in of an excess of air at the place of the SiO$_2$ formation in order to get a finely divided product the oxidation heat was reduced to a temperature level which was of little practical interest and for practical purposes was thus completely destroyed. The present invention, on the other hand, permits to incorporate the carbon black in the silicic acid practically at the price of the crude material.

The amount of the oxidizing agent should be sufficient on the one hand to permit as much oxidation of the silicon monoxide to silicon dioxide as possible and on the other hand to keep at a low level the combustion of the decomposable material which is introduced into the reaction. Preferred is an amount of oxidizing agent which is slightly below or above the stoichiometric amount. However, useful results were still obtained with a three-times to five-times excess.

The mixing ratio of SiO$_2$ to carbon black can be adapted in a wide range to the ultimate use of the product. It depends also on the type and amount of the introduced decomposable compound. The mixtures formed in the process of the invention are compositions of a grey to deep black color depending on the amount of decomposable carbon black furnishing compound and, accordingly, have a specific surface of between 50 and 200 m$^2$/g. They have a homogeneous appearance and in the electron microscope at an enlargement of 50,000:1 have particle sizes between 5 and 300 millimicrons. The electron microscope enlargements show that silicic acid and carbon black are present in the primary particle area in homogeneous statistically uniform distribution.

The decomposable materials preferably are hydrocarbons such as lower to intermediate aliphatics and olefins, acetylene, aromatic compounds, anthracene oils, distillation residues and mixtures of these various materials. Depending on the type of material and the conditions of the reaction, the decomposition leads to varying yields of carbon black. The decomposition may lead to smaller or larger amounts of olefines in the product produced. In such cases, it may be helpful to recirculate the flue gas from which the solids have been separated into the process or to remove the olefins from the flue gas and reintroduce them into the operation.

The gaseous products which are formed in decomposing the carbon compound, such as hydrogen, methane, and olefins cause the gas current to have a high calorific value based also on the carbon monoxide from the electric arc furnace. The easiest way to make use of this calorific value is by using it for heating. For instance, with use of ligroin as carbon black-forming compound and air as oxidizing agent for the silicon monoxide a flue gas was obtained containing 18 volume-percent hydrogen, 15 volume-percent carbon monoxide, 7 volume-percent methane and 4 volume-percent ethane.

The reaction products, in addition to silicon dioxide and carbon black, may also contain portions of nonreacted silicon monoxide which either may show up as solid SiO or in the form of the disproportionation products Si and SiO$_2$, and the reaction product may also contain silicon carbide. These products are present like the main products, silicon dioxide and carbon black, in a highly dispersed form and in superfine distribution. Undesirable effects of these additives have not been noticed.

It is a particular feature of the process of the invention that additional materials which are of importance for the use as rubber additives may be added to the SiO$_2$/carbon black mixture in finely distributed form. Among these are materials which under the conditions of the SiO gas generation may be converted to the gas phase and then may be precipitated in highly dispersed form during the oxidation and subsequent cooling. Among such materials, in addition to, for instance, aluminum oxide and magnesium oxide, is zinc oxide which is an important component of many elastomer mixtures. This can be accomplished simply by adding a corresponding amount of zinc oxide to the quartz-coke initial mixture.

In order to obtain a higher yield of carbon black and to vary the properties of the $SiO_2$-carbon black mixture, it is within the scope of the present invention to dilute the silicon monoxides produced in the electric arc furnace with another gas such as nitrogen, hydrogen or a noble gas. The introduction of these gases preferably is effected through bores in the graphite electrode or through tubes of silicon carbide which pass through the topplate of the electric arc furnace.

The following examples will further illustrate the invention.

EXAMPLE 1

A mixture of quartz sand and coke fines at a ratio of 5:1 was reacted in an electric arc furnace. There was thus obtained an hourly output of 3.8 kg of gaseous silicon monoxide and 2.4 kg carbon monoxide. The gas current left the furnace at a temperature between 2,000 and 2,500° C. It then passed through the gas-mixing device as shown in FIG. 3 of the drawings. Twelve $Nm^3$ of air were added in chamber 22 and 7.4 $Nm^3$ propylene were added in chamber 23. A deep black product was separated in the separator. The product had a specific surface of 69 $m^2/g$ and a pour weight of 27 g/l. The chemical analysis showed a content of 55 weight-percent $SiO_2$, 31 weight-percent carbon black and 11 weight-percent silicon carbide. The benzene-soluble fraction was 2 weight-percent.

Electron microscope enlargements at a scale of 50,000:1 showed round primary particles of $SiO_2$ of a size between about 5 and 300 millimicrons and irregularly formed, for instance flake-shaped, carbon black primary particles of a size between about 5 and 100 millimicrons, both types of particles being uniformly distributed throughout.

EXAMPLE 2

In a similar apparatus and in the same manner as in Example 1, 7.6 $Nm^3$ air/h and 7.0 $Nm^3$ ethylene/h were introduced into the hot SiO-CO gas current. The product obtained had a specific surface of 52 $m^2/g$, a pour weight of 27 g/l and a composition of 52 weight-percent $SiO_2$, 25 weight-percent carbon black and 18 weight-percent SiC. The benzene-soluble fraction was 8.3 weight-percent.

EXAMPLE 3

The process was the same as in Example 2, but an hourly amount of air was used of 26 $Nm^3$ and ethylene of 6 $Nm^3$. The obtained black product had a specific surface of 174 $m^2/g$, an $SiO_2$ content of 71 weight-percent and a carbon black content of 24 weight-percent.

EXAMPLE 4

Oxygen and anthracene oil were fed into a gas current of silicon monoxide and carbon monoxide at a temperature between about 2,000° and 2,500° C. A gas-mixing chamber was used as shown in FIG. 3. A deep black product was obtained with a specific surface of 114 $m^2/g$ and a composition of 48 weight-percent $SiO_2$, 48 weight-percent carbon black, 2 weight-percent SiC, and 1 weight-percent Si.

EXAMPLE 5

Eight and one-half kg of a mixture of quartz chips and fractionated silicon at a ratio of 2.1:1 was continuously introduced into an electric arc furnace. The gas mixing chamber employed was that shown in FIG. 2. Through the chamber 22 there were introduced at an hourly rate 14 $Nm^3$ of air into the silicon monoxide gas current emanating from the electric arc furnace. Through chamber 23 14 l petrol ether (liquid) were introduced hourly through correspondingly small bores. The product obtained had a specific surface of 74 $m^2/g$, a pour weight of 29 g/l and contained 74 weight-percent of $SiO_2$ and 20 weight-percent of carbon black. The electron microscope showed a homogeneous distribution of $SiO_2$ and carbon black in the area of primary particles.

EXAMPLE 6

A gas stream containing about 3.7 kg gaseous silicon monoxide and 2.4 kg carbon monoxide was produced each hour in an electric arc furnace. Through a mixing chamber as shown in FIG. 2 there were introduced 5 $Nm^3$ air/h through chamber 22 and 7 l ligroin (boiling point 90°-100° C) through chamber 23. The ligroin was in vapor form. The obtained black product had a specific surface of 93 $m^2/g$ and a pour weight of 29 g/l. The chemical composition was 54 weight-percent $SiO_2$, 21 weight-percent carbon black, 4 weight-percent Si and 1 weight-percent SiC. The flue gas had the following composition: 18 volume-percent $H_2$, 15 volume-percent CO, 7 volume-percent $CH_4$, 4 volume-percent $C_2H_4$, 3 volume-percent $CO_2$, 40 volume-percent $N_2$, the balance formed by other carbon-containing gas.

EXAMPLE 7

A gas current of 3.8 kg silicon monoxide and 2.4 kg carbon monoxide was produced in an electric arc furnace. The gas was passed into a mixing chamber as shown in FIG. 2. From the lower chamber 22 5 $Nm^3$ air/h were introduced through 60 apertures which had an inclination against the SiO-CO gas current at an angle of 45°. In chamber 23 8.5 $Nm^3$ ethylene/h were introduced through 60 bores at an angle of inclination to the SiO-containing gas current of 60°. There was obtained a dark gray mixture comprising 23 weight-percent $SiO_2$, 20 weight-percent carbon black, 17 weight-percent SiO and 41 weight-percent SiC with a specific surface of 92 $m^2/g$.

EXAMPLE 8

The gas current in this case contained 3.8 kg silicon monoxide and 2.4 kg carbon monoxide per hour and had a temperature between 2,000° and 2,500° C. The mixing chamber employed was that of FIG. 4. From the chamber 42 oxygen was introduced at an hourly rate of 1.6 $Nm^3$ and from chamber 43 an hourly rate was introduced of 3.0 $Nm^3$ of a commercially available $C_3/C_4$ LPG. There was obtained a dark gray highly dispersed mixture comprising 62 weight-percent $SiO_2$, 13 weight-percent carbon black, 13 weight-percent SiO and 13 weight-percent SiC which had a specific surface of 130 $m^2/g$ and a pour weight of 37 g/l.

EXAMPLE 9

The same process was used as described in Example 5. However, additionally, 6 $Nm^3$ argon were introduced each hour into the electric arc furnace through bores in the electrodes. The final product in the form of a highly dispersed mixture had a specific surface of 93 $m^2/g$, a pour weight of 28 g/l, and a chemical composition of 67 weight-percent $SiO_2$, 28 weight-percent carbon black, 2 weight-percent Si and 3 weight-percent SiC.

EXAMPLE 10

Employing the same method as in Example 9 there were used instead of the argon an amount of 5 $Nm^3$ hydrogen. The mixture obtained had a specific surface of 89 $m^2/g$, a pour weight of 28 g/l and a chemical composition of 66 weight-percent $SiO_2$, 28 weight-percent carbon black, 4 weight-percent Si and 2 weight-percent SiC.

EXAMPLE 11

In this case a current of gas was produced containing each hour 3.8 kg silicon monoxide and 2.4 kg carbon monoxide. The gas mixing device was that shown in FIG. 2. From the chamber 22 5 $Nm^3$ steam and from chamber 23 5 $Nm^3$ propylene were introduced. There was obtained a product containing 69 weight-percent $SiO_2$ and 22 weight-percent carbon black. It had a specific surface of 61 $m^2/g$ and a pour weight of 35 g/l. The product was distinguished by particularly high hydrophobic properties.

EXAMPLE 12

In an electric arc furnace a mixture was converted to a gas phase comprising per hour 5.5 kg quartz sand, 1.1 kg petrol coke, and 0.45 kg zinc oxide. The gas chamber was the one shown in FIG. 3. Through chamber 22 8 Nm³ air/hr and through chamber 23 14 liters petrol ether per hour were introduced into the hot gas current. At the separator a black product was removed containing 64 weight-percent $SiO_2$, 26 weight-percent carbon black and 5.3 weight-percent ZnO. The specific surface of the product was 73 m²/g.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. The process of making a highly dispersed homogeneous mixture consisting predominantly of activated carbon black and activated silicic acid, the said process comprising subjecting gaseous silicon monoxide to the action of a gaseous oxidizing agent in an oxidizing zone at a temperature of at least about 2000° C to oxidize the silicon monoxide to silicon dioxide and passing a material that forms carbon black by decomposition at the reaction temperature in the formed gaseous silicon dioxide current while the same is at said temperature thereby causing the decomposition of said carbon black forming material and, substantially simultaneously therewith, causing the formation of said homogeneous mixture of activated carbon black and activated silicic acid.

2. The process of claim 1, wherein the carbon black forming material is passed into the silicon dioxide gas current immediately after it has left said oxidizing zone.

3. The process of claim 1, wherein the oxidation of the silicon monoxide is effected in the presence of carbon monoxide.

4. The process of claim 1, wherein the oxidation is effected by passing oxygen, air or water into said gaseous silicon monoxide at a temperature of about 2,000° to 2,500° C.

5. The process of claim 1, wherein the gaseous silicon monoxide is formed by reacting quartz with a member selected from the group consisting of silicon and coke in an electric arc furnace.

6. The process of claim 1, wherein the gaseous silicon monoxide is diluted with a gas selected from the group consisting of hydrogen, nitrogen and a noble gas prior to passing into said oxidation zone.

7. The process of claim 1, wherein the gaseous silicon monoxide additionally contains a metal oxide that is volatilizable under the conditions of the oxidation reaction.

8. The process of claim 7, wherein the metal oxide is a member selected from the group consisting of aluminum oxide, magnesium oxide, zinc oxide and a mixture of at least two of these oxides.

9. The process of claim 1, wherein the carbon black forming material is a hydrocarbon compound.

10. The process of claim 9 wherein the hydrocarbon compound is a member selected from the group consisting of lower or intermediate aliphatic or olefinic hydrocarbon compounds, acetylene, aromatic compounds and a mixture of such compounds.

11. The process of claim 10, wherein the aromatic compound is an anthracene oil.

* * * * *